United States Patent
Suh

(10) Patent No.: US 7,308,028 B2
(45) Date of Patent: Dec. 11, 2007

(54) APPARATUS AND METHOD FOR GENERATING MOSAIC IMAGES

(75) Inventor: Jong Yeul Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 787 days.

(21) Appl. No.: 10/331,670

(22) Filed: Dec. 27, 2002

(65) Prior Publication Data

US 2003/0133020 A1 Jul. 17, 2003

(30) Foreign Application Priority Data

Dec. 29, 2001 (KR) ............................... 2001-88259

(51) Int. Cl.
*H04B 1/66* (2006.01)

(52) U.S. Cl. ............................ 375/240.12; 375/240.16; 375/240.18; 375/240.25; 375/240.14; 382/236; 382/235; 382/248; 382/260; 382/277; 382/282; 382/293; 345/646; 345/648

(58) Field of Classification Search ............ 375/240.12, 375/240.16, 240.18, 240.25, 240.14; 345/646, 345/648; 382/235, 236, 293, 248, 167, 260, 382/274, 277, 282

See application file for complete search history.

(56) References Cited

U.S. PATENT DOCUMENTS 5,539,469 A * 7/1996 Jung ..................... 375/240.14
6,037,988 A * 3/2000 Gu et al. ................ 375/240.16
6,556,210 B1 * 4/2003 Yamamoto et al. ......... 345/582

FOREIGN PATENT DOCUMENTS

KR 010075948 A 8/2001

OTHER PUBLICATIONS

Choi et al., Method of deciding presence of global motion . . . , Apr. 29, 1999, WO 99/21135, entire document.*

* cited by examiner

*Primary Examiner*—Shawn S. An
(74) *Attorney, Agent, or Firm*—Lee, Hong, Degerman, Kang & Schmadeka

(57) ABSTRACT

The present invention relates to an apparatus and method for generating mosaic images, wherein photographed content is displayed as a still image by a digital TV display or video monitor for an extended period of time. The apparatus of the present invention includes an animation analyzer for output of a motion vector of an input image, a coefficient calculator for calculating transformation and warping coefficients, a means for offsetting illumination differences, and storage for mosaic images. The present invention can advantageously be used for calculating a more accurate transformation coefficient, thereby generating mosaic images with minimal distortion.

15 Claims, 8 Drawing Sheets

APPARATUS AND METHOD FOR GENERATING MOSAIC IMAGES

BACKGROUND OF THE INVENTION

1. Field of the Invention

The present invention relates to an apparatus and method for generating mosaic images, wherein a photographed content by a digital TV display or video monitor for hours on end is displayed in a still image.

2. Description of the Related Art

Normally, mosaic images (or panoramic image) are multiple images, that is, a combination of a set of still images from a video taped sequence or partial frames of a specific section in the video sequence.

A mosaic image is desirable in several aspects that it helps a viewer to see a comprehensive panoramic image of a scene with redundant information removed from individual frames by combining (or stitching) images of the scene, namely expanding visibility range, whereby it can construct a virtually high-resolution image.

FIG. 1 illustrates a known method for constructing mosaic images in the related art.

In that conventional method, one first obtains a transformation coefficient between temporally adjacent frames among a number of frames, and combines (or stitch) each frame according to the transformation matrix to generate a mosaic image.

In other words, according to the conventional method for generating a mosaic image as illustrated in FIG. 1, one analyzes motions between adjacent frames (S1), calculates a transformation coefficient between frames (frame-to-frame) on the basis of the analysis result (S12), warps a current frame responsive to the calculated transformation coefficient for frame-to-frame (S13), combine the warped frame with a mosaic image (S14), and repeats the above steps (S11-S14) to the end of a video sequence to generate a mosaic image therefrom (S15).

The frame-to-frame transformation matrix reflects geometric structural relationship between an actual camera and a background. From that light, it will be meaningless to find the transformation coefficient by coordinating (or matching) the entire frames. Therefore, an individual frame is divided into a constant unit, and one calculates a plurality of motion vectors by carrying out block matching, section matching, or specific point matching upon each unit (S11, S12).

Once the transformation coefficient is calculated, one warps the current frame based on the transformation coefficient, and merges (combines) the warped frame to the mosaic image (S13, S14).

One of the most essential things to generate mosaic images more effectively is an accurate calculation of a global motion represented by the frame-to-frame transformation coefficient.

The global motion is basically attributed to the motion of the background in the images, that is, the actual geometric motion of a camera for photographing an image.

Typical examples of the camera's geometric motion are panning, tilting, rotation and zoom. Hence, one can successfully generate a very effective mosaic image as long as he draws out a more accurate global motion.

One thing that should not be overlooked in actually moving images (animation) is that there are local motions of a moving object besides the global motion, and those local motions, compared to the global motion, are very diverse in their configuration, and arbitrary.

To be short, frame-to-frame motion consists of the global motion and the local motion, and to construct a more effective mosaic image, the local motion should be eliminated in the step of calculating the frame-to-frame transformation coefficient (S12).

One of drawbacks found in the conventional method for calculating the transformation matrix was that one did not know how to react to the local motions of a moving object and further the considerable influence thereof over the accuracy of the frame-to-frame transformation coefficient.

Needless to say, it is the most important yet difficult task to separate the local motion from the global motion. If one fails in the task, he has to face geometrically distorted mosaic images primarily due to the local motion, and provide poor quality images to viewers whether he wanted or not.

Also, the conventional mosaic generation method required one to analyze a motion of every input frame (S11).

More specifically, one had to perform a block matching or specific point matching to analyze a complicated motion, before getting the transformation coefficient.

However, in case of coded images, it is not worthy to perform the block matching a second time because the block matching had already been carried out during the coding process for the purpose of calculating a motion vector. Moreover, in case of the specific point mating, the process itself for finding (extracting) a specific point to match is too difficult and complex for one to do. This problem gets worse when the specific point is occluded by other objects and thus disappeared from a screen. In such case, one has to deal with that complicated situation whether he likes or not.

As a result, the motion analysis requires a vast amount of calculations, especially to hardware and/or software aspects.

As discussed before, a mosaic image is generated by combining each frame conforming to the transformation coefficient calculated.

However, if a photographing region changes as a camera moves, it is always possible that the background, or brightness and colors of other subjects may be changed because of geometric differences created by light, the object and the camera.

In addition, lighting conditions vary, depending on natural causes or man-made causes. If those variations occur as time goes by, each frame will display different brightnesses and colors from one another.

In consequence, variation in the spatial and temporal lighting conditions gives rise to another trouble to one who tries to get an actual video stream (sequence) by stitching each frame because the colors in a neighboring area will not be unified.

SUMMARY OF THE INVENTION

An object of the invention is to solve at least the above problems and/or disadvantages and to provide at least the advantages described hereinafter.

Accordingly, one object of the present invention is to solve the foregoing problems by providing an apparatus and method for generating mosaic images to users based on geometrically accurate information deduced from an accurate calculation of a frame-to-frame transformation coefficient, whereby one can generate mosaic images with the least distortion. This is realized by separating a local motion from a global motion using a majority filter so as to get rid of any influence of a moving object over the calculation of the transformation coefficient, and consequently being free from the local motion's influence.

Especially, the present invention presents methods for generating a mosaic image by utilizing coefficients of an already coded video stream in a step of calculating the frame-to-frame transformation coefficient, calculating a more accurate transformation coefficient based on the global motion by separating a background motion from a subject motion, compensating a color discrepancy in neighboring areas for mosaic construction, and reproducing moving images from mosaic images.

Another object of the present invention is to provide an apparatus and method for generating mosaic images with the least amount of calculation and burden on hardware necessary for calculating the transformation coefficient by having a motion vector information on P picture of an already coded video stream reflected in the calculation of the frame-to-frame transformation coefficient.

Another object of the invention is to provide an apparatus and method for generating mosaic images, capable of compensating color discrepancies between an already existing mosaic image and a new frame to be added (combined) that are usually found in neighboring areas (i.e. boundaries) as one tries to combine frames to construct a mosaic image, the color discrepancies being caused by changed lighting conditions for each frame, thereby eliminating visibility distortion around the boundaries.

Another object of the invention is to provide a method and apparatus for generating mosaic images with a function of reproducing transformed frames on a mosaic background, the frames having been transformed in accordance with transformation coefficients for corresponding frames. Hence, one can easily reproduce moving images from the mosaic images, and further implement a new concept of trick play in a display like digital TVs.

The present invention is also characterized of effective elimination of a local motion by performing a majority filtering process on a number of spatially adjacent motion vectors on the way of calculating the frame-to-frame transformation coefficient of a video. To this end, applied is a linear regression method wherein motion vectors that had passed through the majority filter are input and the frame-to-frame transformation coefficient is obtained therefrom.

Especially when a P picture, one of coded video streams by MPEG, is involved, the frame-to-frame transformation coefficient is calculated by utilizing already coded motion vectors.

Moreover, as for the P picture, the frame-to-frame transformation coefficient can be calculated by interpolating before and after transformation coefficients, and to this end, a coefficient memory where the before and after transformation coefficients are stored and a set of those two transformation coefficients are interpolated.

The present invention detects any changes in illumination by comparing the pixel value distribution of a mosaic image up to date with the pixel value distribution of a current frame, and based on the comparison, it finds out how much the illumination has been changed. To accomplish those, the present invention computes an illumination conditional coefficient for compensating (or offsetting) average detection and comparison, and color discrepancies (i.e. colorimetrical measurement) of a corresponding area for which an average pixel value difference between two corresponding areas in two adjacent images is to be measured.

The present invention also enables one to reproduce a warped moving image with a background of a mosaic image by sequentially expressing (or overlapping) warped frames over an already displayed mosaic image.

The foregoing and other objects and advantages are realized by providing an apparatus for generating mosaic images, which includes: a moving image (animation) analyzer for outputting a motion vector of an input image; a coefficient calculator for calculating a transformation coefficient and a warping coefficient to generate a mosaic image on the basis of the motion vector, and outputting a currently transformed frame image; a means for offsetting illumination differences (or illumination difference compensator) by detecting different illumination conditions between an already generated mosaic image up to date and the currently transformed frame image, and offsetting an illumination difference based on the detection result and outputting a resultant image; and a mosaic image storage for storing a newly generated mosaic image.

According to another aspect of the invention, a method for reproducing a moving image (or animation) includes the steps of: displaying generated mosaic images; obtaining a frame to be displayed at present, a transformation coefficient thereof, a warping coefficient thereof, and an illumination change coefficient thereof; and performing a warping process and a illumination-offset process on the present frame based on the coefficients obtained and then displaying a corresponding frame animation.

According to another aspect of the invention, a method for generating mosaic images includes the steps of: analyzing an image to obtain a motion vector of an input image; calculating a transformation coefficient between a current frame and a previous frame, and a warping coefficient for deriving a relative change between an already generated mosaic image up to date and a currently generated frame; and outputting a mosaic image by detecting any changes in illumination conditions for the already generated mosaic image and the currently generated frame and offsetting illumination differences therebetween.

Accordingly, the present invention implements an additional trick mode as in a digital TV, by generating mosaic images using a series of video stream inputted.

In addition, the present invention can be very advantageously used for minimizing possible visual distortion found on the mosaic images by eliminating a local motion caused by a subject or other noises with help of a majority filter, and calculating a frame-to-frame transformation coefficient based on an accurate global motion necessary for constructing the mosaic images.

Moreover, the present invention can be very advantageously used for reducing cost and lightening burden on hardware from making a separate analysis on a complex motion for an animation, by calculating a frame-to-frame transformation coefficient based on a motion vector that had been encoded and transferred to a video stream.

Another advantage of the present invention, as discussed before, is that it is effective for getting rid of visual distortion primarily because of color discrepancies in borders by offsetting differences of illumination conditions found in two adjacent images.

Further, the present invention provides a user with trick mode functions for reproducing mosaic images at a constant rate, by reproducing respective transformed frames again with a background of an already generated mosaic image.

Especially, the present invention can be advantageously applied to digital TVs, monitors, or aerophoto analyzers, whereby it can provide redundant information removed from individual frames in an existing animation, overcoming visual limitations, and present high-resolution images to users.

For instance, when applied to a digital TV, particularly to a sports broadcast, the present invention can provide the users with a virtual high-resolution image of an entire stadium and trick mode functions.

The above is possible by generating mosaic images based on a series of coherent video stream inputted, and taking advantage of additional trick mode functions provided in the digital TV.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The following detailed description will present an apparatus and method for generating mosaic images according to a preferred embodiment of the invention in reference to the accompanying drawings.

Figure 1:
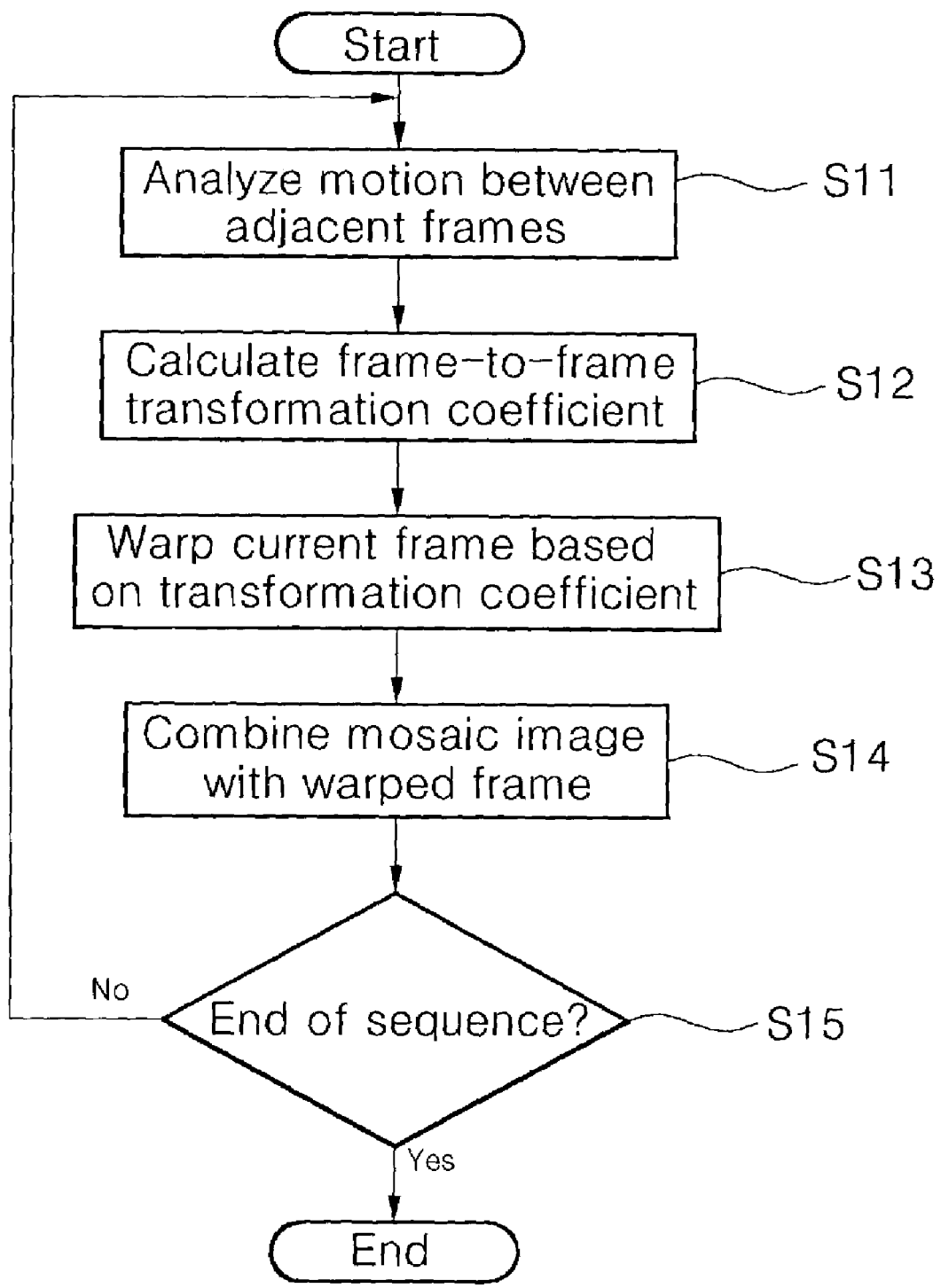
FIG. 1 is a flow chart illustrating a known method for generating mosaic images in a related art.
Figure 2:
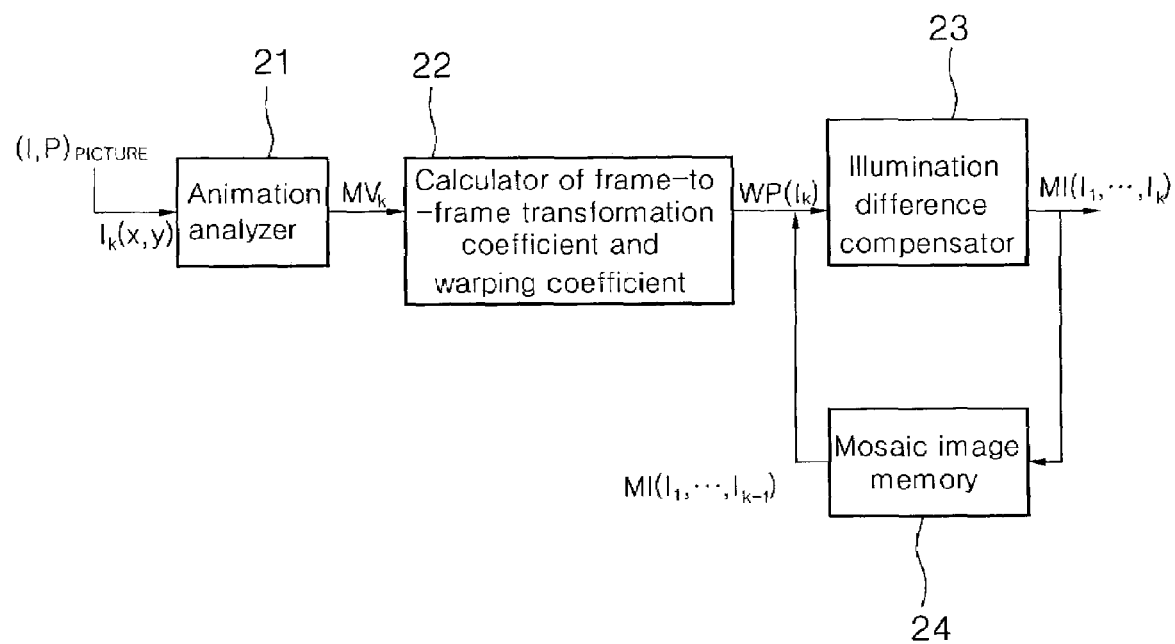
FIG. 2 is a block diagram illustrating an embodiment of an apparatus for generating mosaic images in accordance with the present invention.

FIG. 2 illustrates one embodiment of the apparatus for generating mosaic images according to the present invention.

Referring to FIG. 2, the apparatus for generating mosaic images of the present invention includes an animation analyzer 21 for outputting a motion vector to each macro block of input images (k-th image signal of I Picture or P Picture, Ik (x,y)), a coefficient calculator 3 for calculating a frame-to-frame transformation coefficient and a warping coefficient based on the analysis result, an illumination difference compensator 23 (or means for offsetting illumination differences) for receiving the frame-to-frame coefficient and the warping coefficient input from the coefficient calculator, compensating (or offsetting) any changes in illumination conditions on a corresponding frame, and outputting a resultant mosaic image thereof, and an image memory 24 for storing the mosaic image whose illumination conditions have been compensated to be coherent with others.

To be short, the apparatus for generating mosaic images of the present invention includes an animation analyzer 21, a frame-to-frame transformation and warping coefficients calculator 23, an illumination difference compensator 23 (or illumination chance compensator), and a mosaic image memory 24.

With reference to FIG. 2 and FIGS. 3 through 8, the method for generating mosaic images according to the present invention will be described.

Animation analyzer 21 outputs a motion vector, $MV_k$, for each macro block of an input image (k-th image signal Ik (x,y) of I Picture or P Picture).

On the basis of the motion vector $MV_k$, the coefficient calculator 22 of the frame-to-frame transformation and warping coefficients calculates the frame-to-frame transformation, the warping coefficient WP ($I_k$) that represents warping necessary for constructing a mosaic image from each frame and relative location information, and outputs a currently transformed frame by the warping coefficient.

Illumination difference compensator 23 finds out if there is any difference between illumination conditions of already generated mosaic images MI ($I_1, \ldots, I_{k-1}$) provided by the mosaic image memory 24 and illumination conditions of the current frame, and if there is, compensates (offsets) the difference, thereby eliminating a possible boundary that is often made when a user merges the current frame with the already generated images.

[1]. Animation Analysis Procedure

Figure 3:
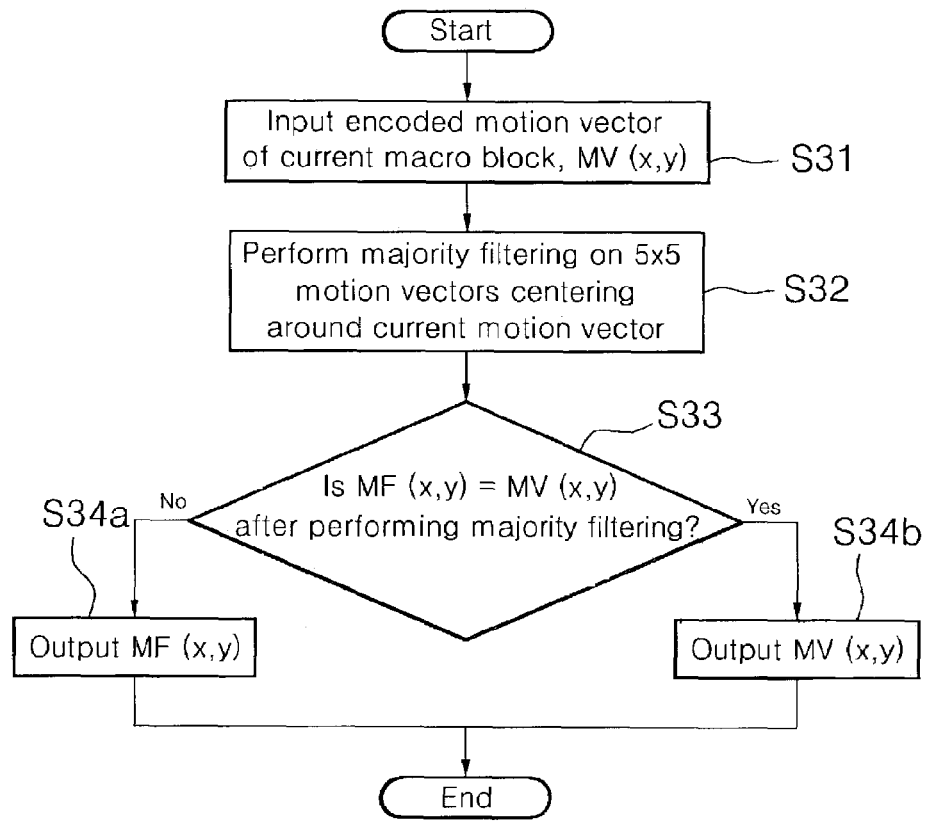
FIG. 3 is a flow chart explaining about an animation analysis in accordance with the present invention.

FIG. 3 illustrates what the animation analyzer does in the apparatus for generating mosaic images of the present invention. As depicted in the drawing, the animation analyzer inputs a coded motion vector MV (x,y) of a current macro block (S31), performs a majority filtering process on a predetermined number of motion vectors (for instance, 5×5) centering around the motion vector (S32), compares the vector MF (x,y) gone through the majority filtering to the motion vector MV (x,y) (S33), and outputs MF (x,y) as an animation analysis result if the MF (x,y) is not the same with the motion vector MV (x,y) (S34a) while outputs MV (x,y) as the animation analysis result if it turns out that MF (x,y) is the same with the MV (x,y).

In FIG. 3, the animation analysis procedure also includes a step of eliminating a motion vector attributable to a local motion of a subject among inputted motion vectors MV (x,y) of P Picture.

To expatiate more, when it says that the MV (x,y) and the MF (x,y) are same, it means that there is no local motion. On the other hand, when the MV (x,y) and the MF (x,y) are different from each other, it means that there is a local motion to be deleted. In such case, a filtered vector MV (x,y) is replaced with MF (x,y).

That is, MV (x,y) is an original motion vector before the filtering process is performed, and MF (x,y) is a component of the most dominant motion vector centering around a macro block at a position (x,y) of a coordinate system.

Therefore, when it say that two vectors are different from each other, it means the motion vector corresponding to a current macro block is an existing local motion, and thus a filtering process needs to be carried out. This is why the MV (x,y) is replaced with MF (x,y).

As a result thereof, the animation analyzer 21 calculates a transformation coefficient between a reference image I Picture and the current image, by using a set of motion vectors $MV_k$.

Elimination of the motion vector caused by the local motion among already coded motion vectors (S32) can be accomplished by applying 5×5 window around the current motion vector for all input motion vectors.

Figure 4:
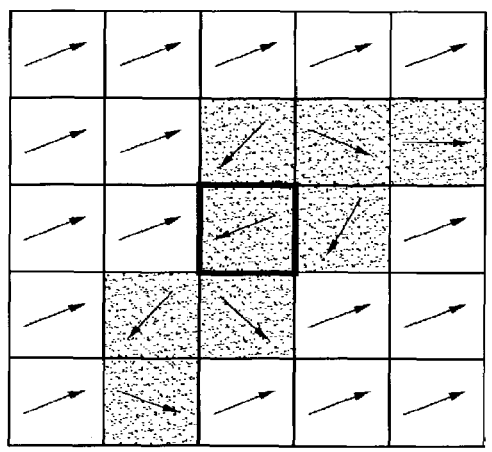
FIG. 4 is an explanatory diagram demonstrating how to apply a majority filter of an image analyzer in accordance with the present invention.

Particularly, FIG. 4 illustrates an embodiment in which a majority filter is applied to the 5×5 window centered around the current macro block.

Each square in FIG. 4 represents one macro block.

Especially, the square with bold lines (at the center) indicates a macro block to be processed at present, and a majority filter is applied to the other 5×5 motion vectors (S32). The motion vector with the highest frequency is chosen as the motion vector of a current macro block (S34a/S34b).

For instance, in FIG. 4, the motion vector in clear regions are the ones with the highest frequency, which means that this motion vector is an output vector the majority filter outputs later.

On the other hand, the animation analyzer 21 concludes the motion vector in hatched regions is the one caused by the local motion.

As shown in the drawing, the local motion, relative to the global motion of the screen, is not a big deal but a little noise-like one, and it appears much less often than the motion vector caused by the global motion. Therefore, one can easily get rid of the vectors coming of the local motion by using the majority filter.

Shortly speaking, animation analyzer 21 substitutes the motion vector MV (x,y) of the current macro block with the motion vector that has passed through the majority filter (S34a/S34b).

Therefore, although it is possible that the motion vector caused by the local motion may exist in the current macro block, it is soon removed as the majority filter eliminates the local motion, whereby a vector that represents the global motion gets outputted at the end.

One thing to be careful here is that the motion vector for use in the majority filter has to be encoded by all means before it is transferred, and it should be distinguished from the motion vector that is transferred to the next step, the coefficient calculator 22.

In other words, the motion vector generated by an application of the majority filter (S34a, S34b) is used to calculate the frame-to-frame transformation coefficient, and an old (or already existing) coded motion vector is used for the 5×5 window centering around a macro block to be processed next.

Meanwhile, the macro block having been encoded in an intra mode in P Picture is regarded as a local motion, so it has nothing to do with the calculation of the transformation coefficient.

Figure 5:
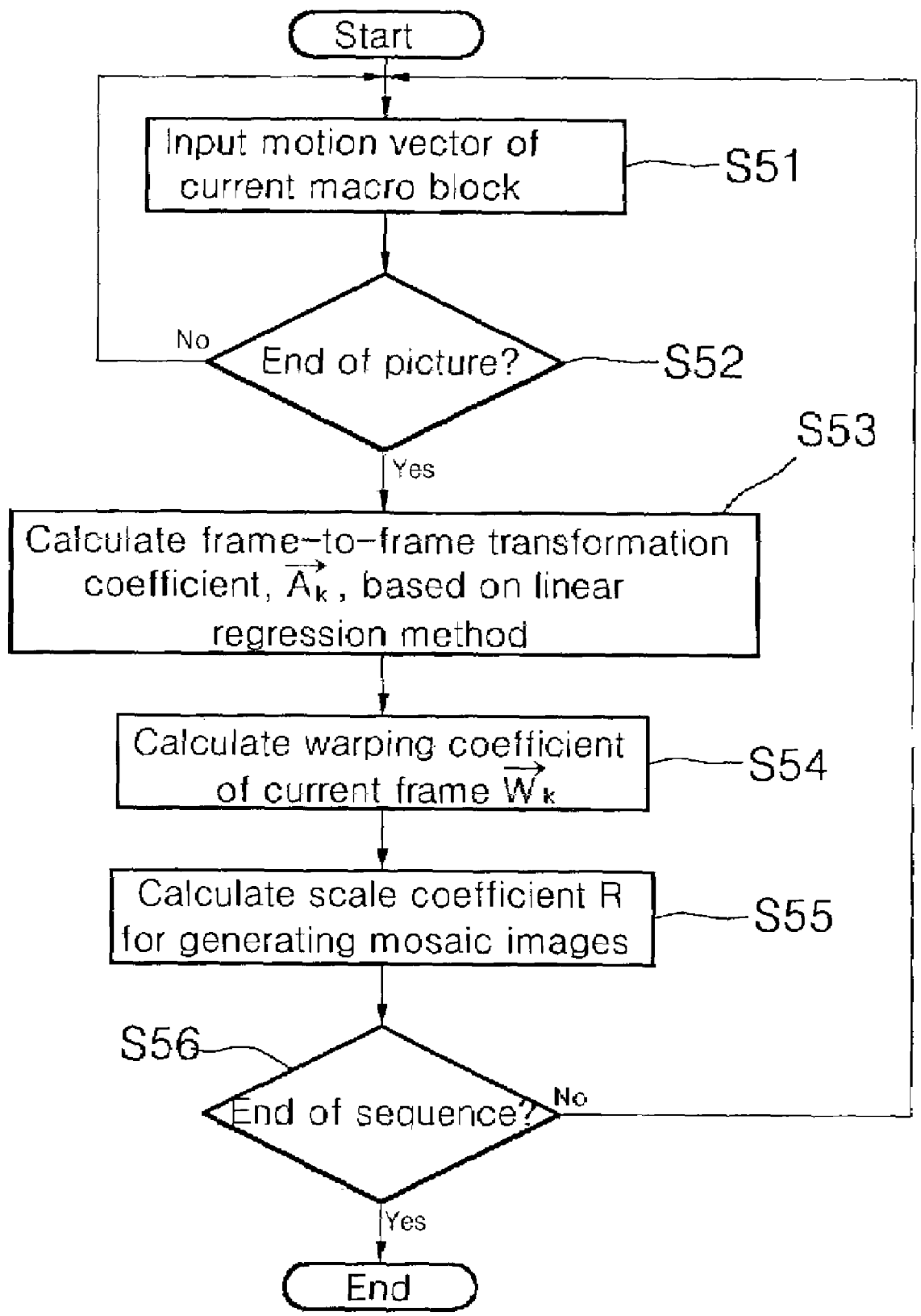
FIG. 5 is a typical flow chart explaining about calculations of a frame-to-frame transformation coefficient and a warping coefficient in accordance with the present invention.

[2]. Calculation Procedure for Transformation Coefficient and Warping Coefficient FIG. 5 depicts general operations conducted by the frame transformation coefficient and warping coefficient calculator 22. Particularly, FIG. 5 covers the entire procedure involved in the transformation of images for constructing a mosaic image.

The procedure includes the steps of: inputting a motion vector of the current macro block in the entire corresponding picture (S51, S52); calculating the frame-to-frame transformation coefficient, $\vec{A_K}$, based on the linear regression method (S53); calculating the warping coefficient, $\vec{W_K}$, of the current frame (S54); and repeating the above steps (S51 through S55) to the end of the animation video sequence (S56).

As shown in FIG. 5, the coefficient calculator 22 obtains the frame-to-frame transformation coefficient of the current frame by applying the linear regression method to the motion vector $MV_k$ inputted from the animation analyzer 21.

In fact, it is necessary to define the transformation coefficient prior to calculating the transformation coefficient, and the transformation coefficient should be able to reflect geometric motions of an actual camera. Hence, there is a need to model appropriate panning, tilting, rotation or zoom.

For example, in the present invention models a frame's transformation coefficient through an affine transformation composed of four coefficients as shown in Mathematical Equation 1 below.

$$\begin{pmatrix} x' \\ y' \end{pmatrix} = \begin{pmatrix} a1 & a2 \\ -a2 & a1 \end{pmatrix} \begin{pmatrix} x \\ y \end{pmatrix} + \begin{pmatrix} a3 \\ a4 \end{pmatrix} \quad \text{[Mathematical Equation 1]}$$

Suppose that there is an arbitrary point of the current frame with coordinates $(x,y)^T$, and a corresponding point of the reference frame has coordinates $(x', y')^T$. Then, these two points are related to each other, namely a transformation relationship between two points, in accordance with the Mathematical Equation 1.

In other words, the transformation between the current frame and the reference frame can be defined with four coefficients, a1, a2, a3 and a4. Since the affine transformation allows panning, tilting, rotation and zoom, a user can have a substantial modeling of the geometric relationship between a camera projected on a two-dimensional image plane and a subject.

Among the four coefficients, a1 and a2 are contributed to rotation and zoom, and the other coefficients a3 and a4 are contributed to panning and tilting.

In summary, given a coordinate system for a specific frame, to calculate a transformation coefficient for generating mosaic images is to calculate relative coordinates of the other frames to the reference coordinate system.

As such, the linear regression method is first applied to an input motion vector in order to get those four coefficients a1, a2, a3 and a4 designated for the affine transformation.

The above Mathematical Equation 1, however, only represents the coordinate system for two images, meaning it cannot be applied directly to a motion vector. Thus, the Equation 1 is modified as follows:

$$\begin{pmatrix} \Delta x \\ \Delta y \end{pmatrix} = \begin{pmatrix} a1-1 & a2 \\ -a2 & a1-1 \end{pmatrix} \begin{pmatrix} x \\ y \end{pmatrix} + \begin{pmatrix} a3 \\ a4 \end{pmatrix} \quad \text{[Mathematical Equation 2]}$$

In the Mathematical Equation 2, $(\Delta x, \Delta y)^T$ indicates a motion vector of the current macro block, the vector having gone through the majority filtering process, while $(x, y)^T$ indicates a coordinate within the frame of the starting point of the macro block currently being processed.

When the linear regression method is applied to the Equation 2, two independent steps are created. Therefore, an additional modification has to be done thereto for integrating (combining) two separate steps to one.

The following Mathematical Equation 3 is a derivative of the Mathematical Equation 2 with a simple derivation. This equation is used for calculating the four frame-to-frame transformation coefficients, i.e. a1, a2, a3 and a4, collectively.

[Mathematical Equation 3]

$$\begin{pmatrix} \Delta x \\ \Delta y \end{pmatrix} = \begin{pmatrix} x & y & 1 & 0 \\ y & -x & 0 & 1 \end{pmatrix} \begin{pmatrix} a1-1 \\ a2 \\ a3 \\ a4 \end{pmatrix}$$

The four affine transformation coefficients in the Mathematical Equation 3 can be obtained by employing the linear regression method as shown in Mathematical Equation 4 below:

[Mathematical Equation 4]

$$\begin{pmatrix} a1-1 \\ a2 \\ a3 \\ a4 \end{pmatrix} = \begin{pmatrix} \sum_{i=0}^{N-1}(x_i^2+y_i^2) & 0 & \sum_{i=0}^{N-1}x_i & \sum_{i=0}^{N-1}y_i \\ 0 & \sum_{i=0}^{N-1}(x_i^2+y_i^2) & \sum_{i=0}^{N-1}y_i & -\sum_{i=0}^{N-1}x_i \\ \sum_{i=0}^{N-1}x_i & \sum_{i=0}^{N-1}y_i & N & 0 \\ \sum_{i=0}^{N-1}y_i & -\sum_{i=0}^{N-1}x_i & 0 & N \end{pmatrix}^{-1} \begin{pmatrix} \sum_{i=0}^{N-1}(x_i\Delta x_i+y_i\Delta y_i) \\ \sum_{i=0}^{N-1}(y_i\Delta x_i-x_i\Delta y_i) \\ \sum_{i=0}^{N-1}x_i \\ \sum_{i=0}^{N-1}y_i \end{pmatrix}$$

Here, the index value, i, indicates an address of each macro block, and N corresponds to a maximum address of the macro block.

As illustrated in the Mathematical Equation 4, the frame's transformation coefficient calculator 22 allocates a separate memory space to a motion vector transferred from the animation analyzer 21 for every macro block, and simply performs an addition operation on the resultant value up to date. Therefore, what is basically needed here is a memory space for storing the result from the addition operation and nothing more.

The coefficient calculator 22 requires the memory space necessary for the calculation step of the frame transformation coefficient, wherein the memory space is big enough to store the addition result of all of the 8 parameters shown in the Equation 4, such as, $x_i$, $y_i$, $x_i\Delta x_i$, $y_i\Delta y_i$, $y_i\Delta x_i$, $x_i\Delta y_i$, $x_i^2$, and $y_i^2$.

After the transformation coefficient is obtained from the Equation 4, the current frame is transformed based on the transformation equation, namely the Equation 1, discussed before. However, the transformation equation simply uses a former frame as a reference, so it is not quite useful to combine frames to the existing mosaic image. The bottom line is that the current frame needs to be transformed responsive to the transformation coefficient for the combination with the existing mosaic images up to date.

In the present invention, a warping coefficient for actually combining the frame with the mosaic image is defined as WP ($I_k$), and based on this warning coefficient, the current frame is merged with the mosaic image.

In the embodiment of the present invention, the first frame of a video sequence was chosen as the reference image, and other frames generated afterward went through the transformation process in consecutive order to construct a mosaic image.

For instance, suppose that one generated a mosaic image by using (K-1) frames up to date, and now tries to combine K-th frame to the mosaic image. Given that a frame-to-frame transformation coefficient matrix between the K-th frame and the (K-1)th frame is $\vec{A_K}$, and a warping coefficient matrix for the K-th frame is $\vec{W_K}$, there can be derived the following Mathematical Equation 5.

[Mathematical Equation 5]

$$\vec{W_k} = \vec{A_1} \cdot \vec{A_2} \cdot \ldots \cdot \vec{A_{K-2}} \cdot \vec{A_{K-1}} \cdot \vec{A_K}$$

The resultant mosaic image turned out to be larger than what the display can show. Therefore, one should perform a scale operation to display the image on the same screen.

According to the present invention, the warping coefficient calculator 22 calculates a scale coefficient, R, and consequently the warping coefficient is the multiplication of the previously calculated transformation coefficient by the scale coefficient. The scale coefficient can be obtained from the Mathematical Equation 6 by using the ratio of a maximum coordinate that is generated when the current frame was combined with the already existing mosaic image to a maximum coordinate within the limits of the display.

[Mathematical Equation 6]

$$R = \max((MIX_{max}/DX_{max}), (MIY_{max}/DY_{max}))$$

In the Equation 6, $MIX_{max}$ and $MIY_{max}$ represent a maximum X coordinate and a maximum Y coordinate, respectively, which are created in process of combining the current frame with the already generated mosaic image up to date.

In addition, $DX_{max}$ and $DY_{max}$ represent a maximum X coordinate and a maximum Y coordinate that are allowed by the display.

To give a brief summary on the foregoing discussion, the frame transformation coefficient calculation step involves calculating a transformation coefficient between the current frame and the previous frame, and the warping coefficient calculation step involves deriving a relative transformation relationship of the current frame to the already generated mosaic image, and lastly, the scale operation is performed in consideration with the maximum coordinate within the limit set by the display.

[2.1] Procedure for Calculating Transformation Coefficient

Figure 6:
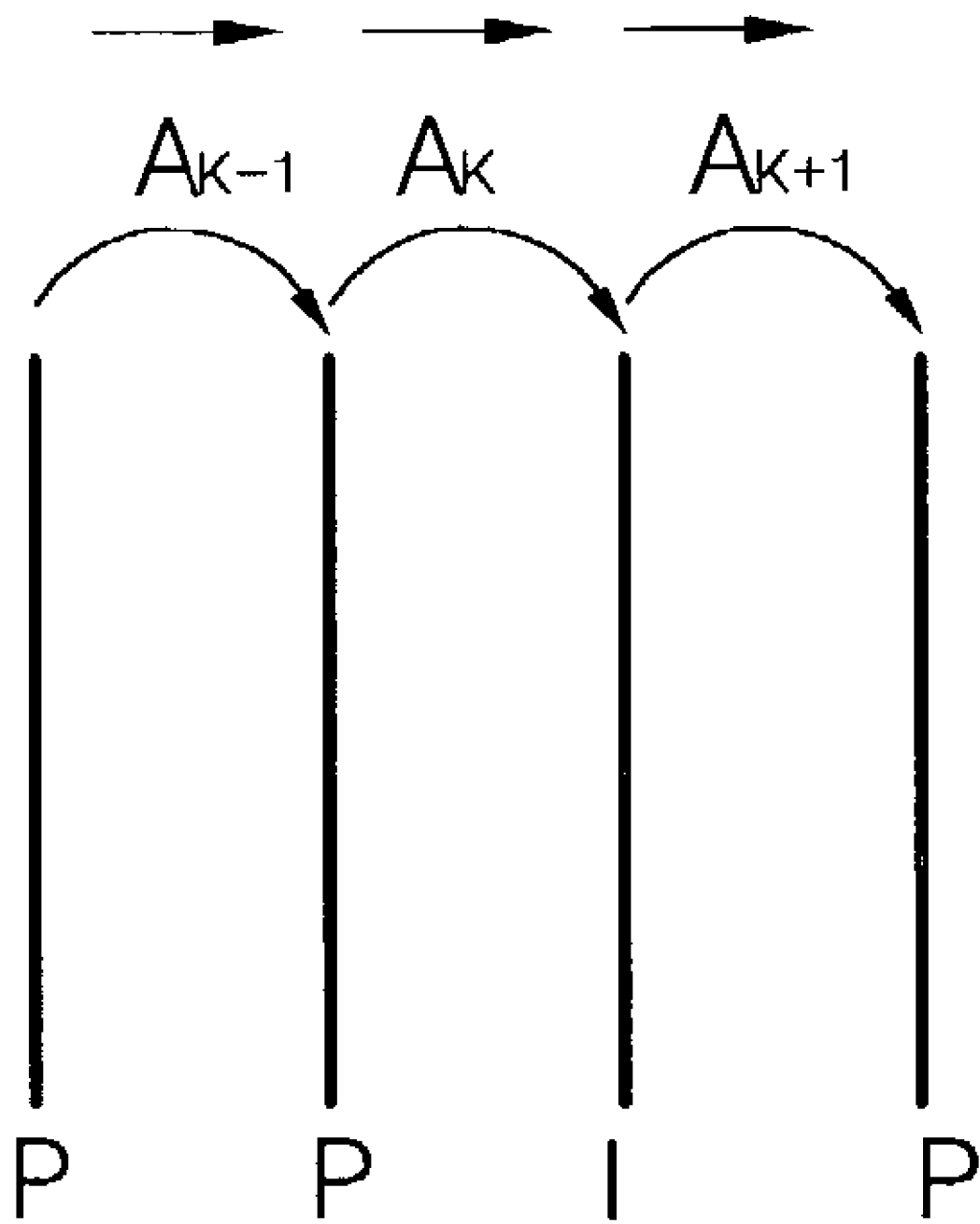
FIG. 6 is an explanatory diagram representing how to calculate a transformation coefficient of I Picture where no motion vector is available.

FIG. 6 diagrammatically represents a concept of interpolation method for calculating a transformation coefficient for I Picture without a motion vector.

Figure 7:
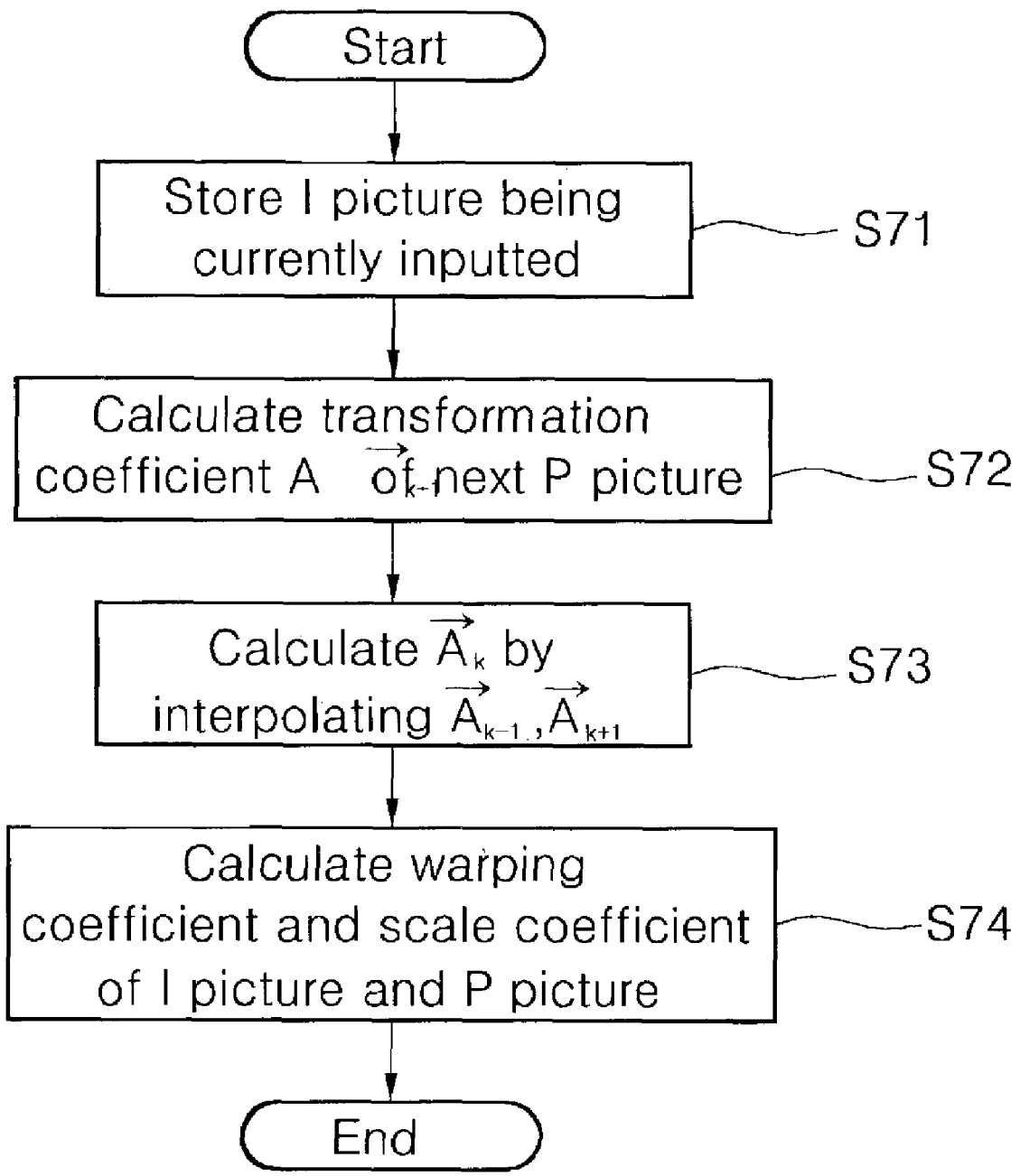
FIG. 7 is a flow chart explaining an image transformation procedure for constructing a mosaic image of I Picture in accordance with the present invention.

In fact, FIG. 6 details the step 73 of FIG. 7.

Here, the transformation coefficient $\vec{A_K}$ of I Picture is calculated by interpolating a transformation coefficient of P Picture prior to I Picture, $\vec{A_{K-1}}$, and a transformation coefficient of P Picture after I Picture, $\vec{A_{K+1}}$.

[2.2] Image Transformation Procedure for Generating Mosaic Images of I Picture

FIG. 7 is a flow chart explaining the image transformation procedure in connection with mosaic images of I Picture.

As shown in the drawing, the procedure includes the steps of: storing a currently inputted I picture (S71); calculating a transformation coefficient of a following P Picture, $\overrightarrow{A_{K+1}}$ (S72); interpolating a transformation coefficient of a previous P Picture, $\overrightarrow{A_{K-1}}$, and a transformation coefficient of a next P Picture, $\overrightarrow{A_{K+1}}$, to calculate a transformation coefficient of a current I Picture, $\overrightarrow{A_K}$ (S73); and calculating a warping coefficient and a scale coefficient of the I Picture and the P Picture (S74).

Greater details on the method for calculating the frame transformation coefficient and the warping coefficient are now provided below.

First of all, the currently inputted I Picture is stored in the frame memory where the transformation coefficient of the previous P Picture $\overrightarrow{A_{K-1}}$ has been stored (S71). Then, the transformation coefficient of the next P Picture $\overrightarrow{A_{K+1}}$ is calculated (S72). Once the calculation of $\overrightarrow{A_{K+1}}$ is completed, the transformation coefficient of the I Picture, $\overrightarrow{A_{K+1}}$, is calculated by applying one dimensional interpolation method to $\overrightarrow{A_{K-1}}$ and $\overrightarrow{A_{K+1}}$ (S73).

Thusly interpolated transformation coefficient $\overrightarrow{A_K}$ is used for calculating the warping coefficient and the scale coefficient of the I Picture after all (S74).

For one's information, note that B Picture was not used for generating mosaic images in the present invention. For example, in case of a general MPEG video stream where M=3, two frames are skipped for constructing a panoramic image. Considering that a reduced temporary sampling rate for generating the panoramic image (i.e. down to ⅓) has no influence over the picture quality of the panoramic image and that the B Picture has poor picture quality in general, one might as well skip the B Picture since it has little impact on the whole performance in general.

[3]. Procedure for Compensating Illumination Change

Figure 8:
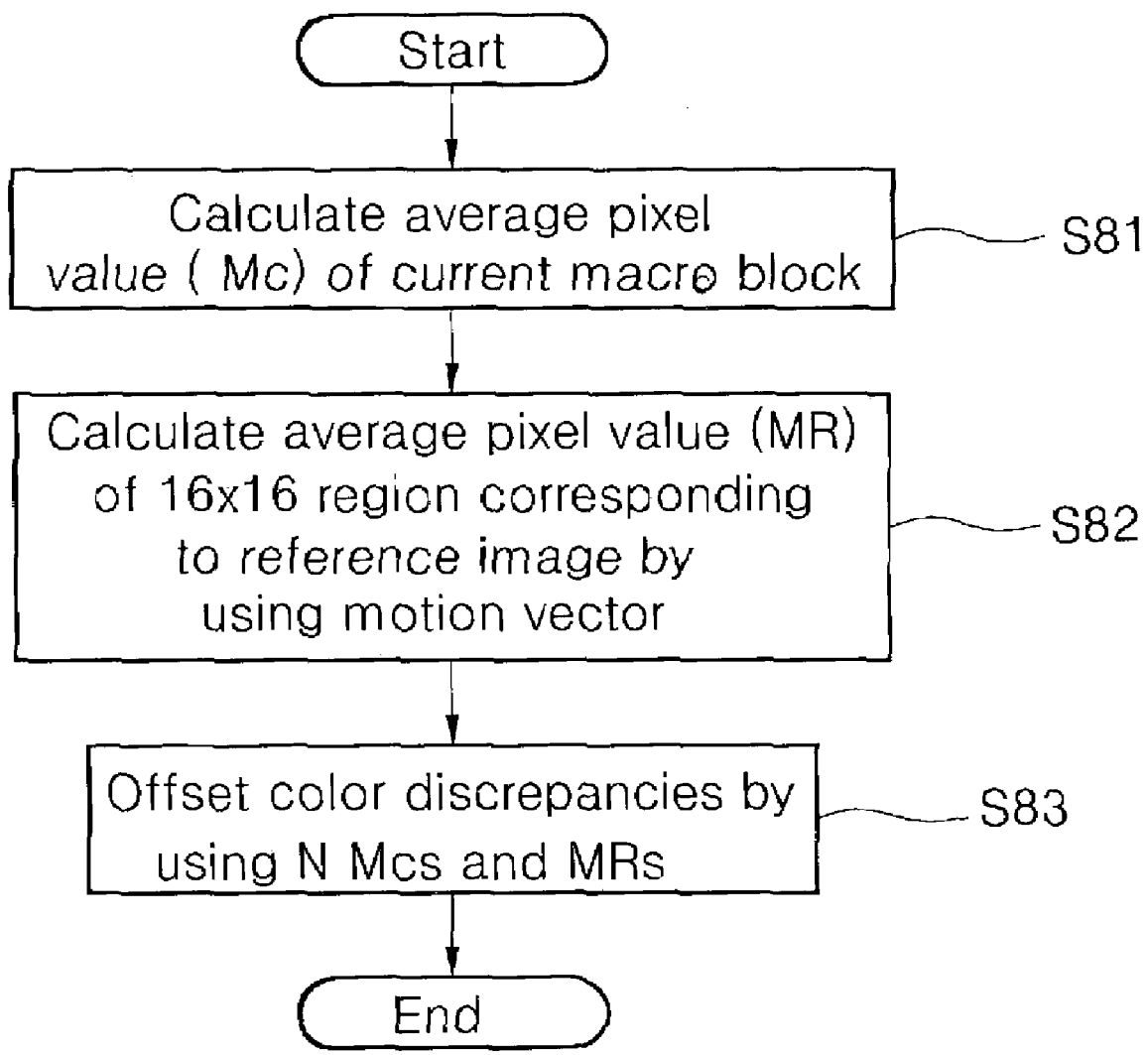
FIG. 8 is a flow chart explaining an operation performed by an illumination change compensating (offsetting) unit in accordance with the present invention.

FIG. 8 shows what the illumination difference compensator does.

As shown in FIG. 8, the illumination difference compensator 23 calculates an average $M_c$ of pixel values of the current macro block (S81), calculating an average $M_R$ of pixel values out of a predetermined region (e.g. 16×16) corresponding to a reference image by using a motion vector (S82), and performing an operation for offsetting color discrepancies by using N $M_c$s and $M_R$s (S83).

That is, the illumination difference compensator 23 shown in FIG. 8 detects whether illumination conditions have been changed or not, and if they have, figures out the amount (or degree) of the change for thereby eliminating any possible distortion around the boundaries in process of combining the current warped frame with the already generated mosaic image. The illumination difference compensator 23 compensates (offsets) the difference of illumination conditions between the current frame and the reference frame. As such, when the user tries to construct a panoramic image, there is no visually distorted part due to colorimetical discrepancies in the boundaries.

In general, it is not unusual to find distorted images in the boundaries with neighboring images in process of generating a panoramic image. The distortion occurs primarily due to an error in the procedure for calculating the transformation coefficient and different illumination conditions applied to adjacent frames.

Particularly, the illumination difference compensator 23 takes proper actions to correct the distortion caused by the changed illumination conditions.

In the present invention, the difference in illumination conditions was offset with an application of color changes in a corresponding pair of a specific point.

As shown in FIG. 8, as an attempt to utilize the coefficients that had been transferred through a video stream as much as possible, one particularly uses an average pixel value of a relevant macro block, a motion vector, and an average pixel value of a corresponding area with a pixel size of 16×16 in a reference image. In other words, having supposed the macro block as a point, observed are the color changes in corresponding pairs of each point. This principle is simplified in Mathematical Equation 7 wherein the currently inputted image $I_c$ is represented by:

[Mathematical Equation 7]

$$I_c = \{MC_i | 0 \leq i \leq mba_{max}\}$$

According to the Equation 7, the current image is down sampled to 1/256. Here, $MC_i$ indicates an average pixel value of i-th macro block, and $mba_{max}$ indicates a maximum address of the macro block. The calculation conforming to the Equation above corresponds to the step 81.

On the other hand, the Mathematical Equation 8 expresses a set of pixels, i.e. $I_R$, of the reference image corresponding to $I_c$. Also, $MR_i$ denotes an average pixel value of a region with the pixel size of 16×16 corresponding to $MC_i$ with help of a motion vector. The calculation conforming to the Equation 8 falls in the step 82.

[Mathematical Equation 8]

$$I_R = \{MR_i | 0 \leq i \leq mba_{max}\}$$

In the present invention, the difference of the illumination conditions between the sets of pixels $I_R$ of the current image $I_c$ and the reference image corresponding to $I_c$ is modeled to a simple linear equation as shown in the Mathematical Equation 9 below.

[Mathematical Equation 9]

$$I\_R = L\_1 \cdot I\_C + L\_2$$

As such, color changes in two frames can be defined with the coefficients $L_1$ and $L_2$ related to illumination condition changes.

The coefficients $L_1$ and $L_2$ can be derived from the Mathematical Equation 10.

[Mathematical Equation 10]

$$\begin{pmatrix} L_1 \\ L_2 \end{pmatrix} = \begin{pmatrix} \sum_{i=0}^{mba_{max}} MC_i^2 & \sum_{i=0}^{mba_{max}} MC_i \\ \sum_{i=0}^{mba_{max}} MC_i & mba_{max}+1 \end{pmatrix}^{-1} \begin{pmatrix} \sum_{i=0}^{mba_{max}} MC_i \cdot MR_i \\ \sum_{i=0}^{mba_{max}} MR_i \end{pmatrix}$$

After calculating the coefficients $L_1$ and $L_2$, the illumination difference compensator 23 offsets the difference between illumination conditions in the currently warped image in accordance with the transformation equation defined in the above Equation 9. That is, the compensation process is performed based on $I_R=L_1 \cdot I_c+L_2$.

Once an image goes through the compensation process, the image is entitled to be combined with the mosaic image, and finally, a set of images MI ($I_1, \ldots, I_k$) whose illumination conditions are appropriately offset one another is outputted.

[4]. Method for Reproducing Animation

Figure 9:
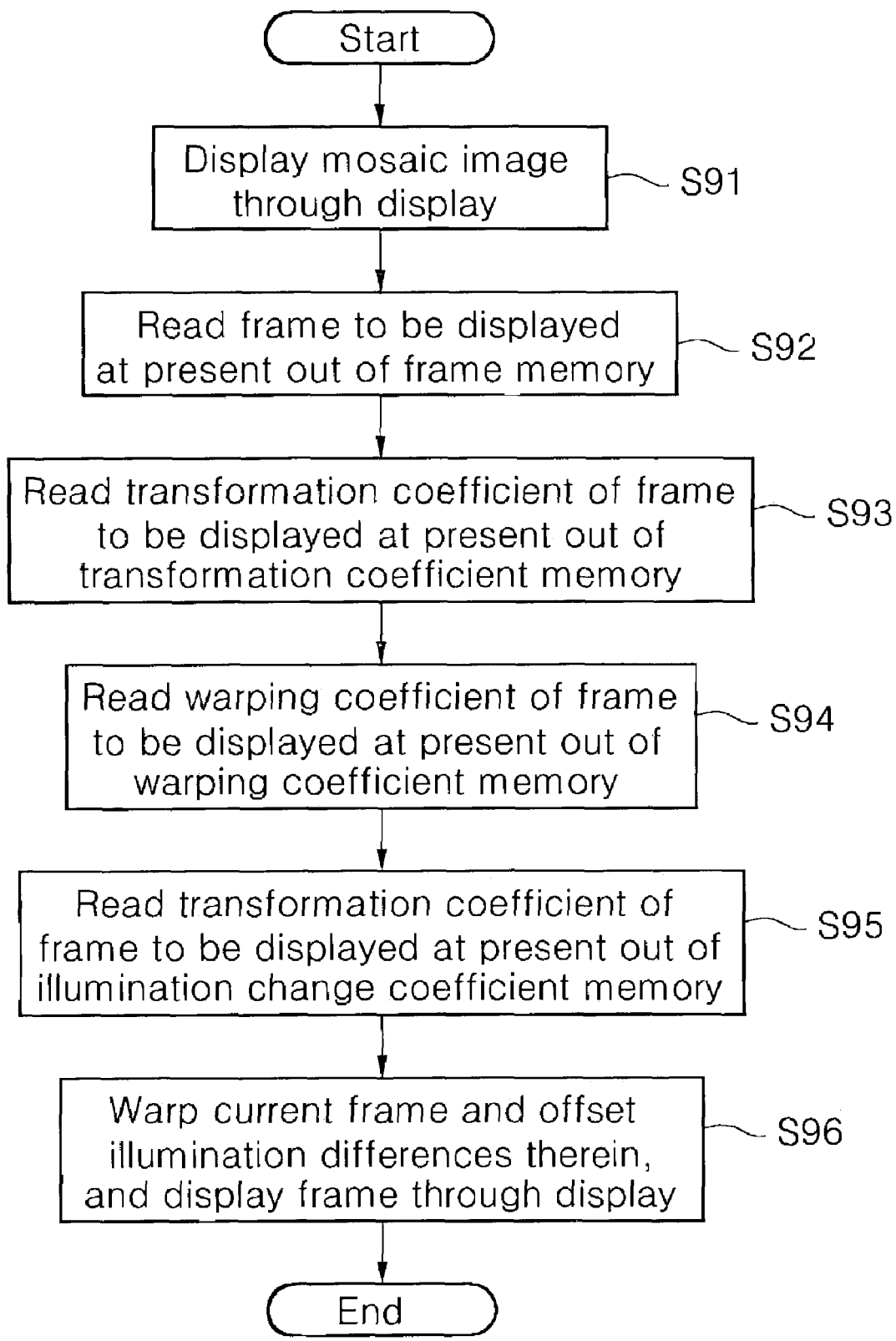
FIG. 9 is a flow chart explaining a method for reproducing mosaic images in accordance with the present invention.

FIG. 9 illustrates a method for reproducing animation according to the present invention.

Referring now to FIG. 9, the method for reproducing animation includes the steps of: displaying the mosaic image generated above through the display (S91); reading a frame to be displayed at present out of the frame memory (S92); reading the frame's transformation coefficient of the frame to be displayed at present out of the transformation coefficient memory (S93); reading the warping coefficient of the frame to be displayed at present out of the warping coefficient memory (S94); reading the illumination change coefficient of the frame to be displayed at present out of the illumination change coefficient memory (S95); and performing the warping and illumination compensating processes on the present frame and displaying the frame on the display (S96).

As discussed before, each memory can be mounted in the animation analyzer 21, the coefficient calculator 22, and the illumination difference compensator 23, respectively.

Returning to FIG. 9, if the user wants to reproduce animation, he can do that after he finished constructing the mosaic image and then reproduces a corresponding pre-stored animation in a reproducing mode (S91).

Then, the display reads the frame to be reproduced at present out of the frame memory, and applies the pre-stored transformation coefficient, warping coefficient, and illumination change coefficient thereto (S92 through S96), thereby reproducing a warped frame for the user.

As mentioned before, the present invention also provides the user with additional trick mode functions in addition to the function of displaying transformed frames on the mosaic image in consecutive order.

Although only the I Picture and P Picture were used for generating mosaic images in the present invention, if M=3, the reproduction rate is automatically tripled.

More details on the above will be provided hereinafter.

Normally, as for indicating a GOP (group of pictures) size in MPEG-2 video coding, N means the number of frames belonging to the GOP, and M means an interval between anchor frames.

For instance, when N=15, it means that 15 frames are available in one single GOP, and one I picture per 15 frames.

The anchor frame is the one that can be used as a reference image for calculating a motion vector. It usually indicates either I picture or P picture.

Therefore, when M=3, it means that the interval (or gap) between I picture and P picture is 3, and so is the interval of two P pictures.

Suppose that N=15, and M=3. Then, the GOP has the following format:

I B B P B B P B B P B B P B B

That is, a mosaic image is constructed by skipping three pieces, and when reproduced, the reproduction rate is tripled.

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for generating mosaic images, comprising:
   an animation analyzer for outputting a motion vector of an input image;
   a coefficient calculator for calculating a transformation coefficient and a warping coefficient to generate a mosaic image on the basis of the motion vector, and outputting a currently transformed frame image;
   a means for offsetting illumination differences by detecting different illumination conditions between an already generated mosaic image up to date and the currently transformed frame image, offsetting an illumination difference based on the detection result and outputting a resultant image; and
   a mosaic image storage for storing a newly generated mosaic image and outputting to the means for offsetting illumination differences,
   wherein the animation analyzer regards a macro block that has been encoded from a P picture to an I (intra) mode in a MPEG compression environment as a local motion, and prevents the encoded macro block from influencing on a calculation of the transformation coefficient.

2. The apparatus according to claim 1, wherein the animation analyzer performs a majority filtering process on a window centering around a currently encoded and transferred motion vector in order to eliminate a motion vector caused by a local motion in a corresponding frame.

3. The apparatus according to claim 1, wherein the animation analyzer replaces a motion vector of a current macro block with a motion vector that has been passed through a majority filter and outputs the filtered motion vector, by applying the majority filtering process to a designated window centering around the current motion vector.

4. The apparatus according to claim 1, wherein the coefficient calculator obtains the transformation coefficient of a current frame by applying a linear regression method to a motion vector, and calculates the warping coefficient by deriving a relative transformation relationship between the already generated mosaic image up to date and the current frame.

5. The apparatus according to claim 1, wherein the means for offsetting illumination differences detects any changes in illumination conditions by employing color discrepancies found in corresponding pairs of a specific point, and offsets the color discrepancies based on the detection result.

6. A method for generating mosaic images, comprising the steps of:
   analyzing an image for obtaining a motion vector of an input image;
   calculating a transformation coefficient between a current frame and a previous frame and a warping coefficient for deriving a relative transformation relationship between an already generated mosaic image up to date and the current frame; and detecting any changes of illumination conditions in the already generated mosaic image up to date and the current frame for thereby displaying a mosaic image whose illumination conditions have been properly offset to be coherent with other adjacent images, wherein the step for calculating the coefficient comprises the sub-steps of:

calculating the frame-to-frame transformation coefficient by applying the linear regression method to a motion vector of a current macro block;

calculating the warping coefficient of the current frame based on the transformation coefficient; and calculating a scale coefficient within a display limit of a display based on the calculated coefficients.

7. The method according to claim 6, wherein the step for analyzing an image for obtaining the motion vector comprises the sub-steps of:

performing a majority filtering step on a designated window centering around an encoded motion vector of a current macro block; and outputting the motion vector that has been passed through a majority filter or outputting the motion vector of the current macro block in accordance with a comparison result of the majority filtering with the motion vector of the current macro block.

8. The method according to claim 6, wherein the frame-to-frame transformation coefficient is calculated by applying a linear regression method to an input motion vector for thereby performing an affine transformation, and modeling a frame's transformation coefficient by making at least one of geometric motions of a camera, namely panning, tilting, rotation and zoom.

9. The method according to claim 8, wherein the step for calculating the coefficient further comprises the sub-steps of:

inputting a first Picture;

calculating a transformation coefficient of a second Picture before and after the first Picture;

calculating a transformation coefficient of the first Picture by interpolating the transformation coefficient of the second Picture; and calculating at least one of a warping coefficient and a scale coefficient of the first and second Pictures on the basis of the calculated coefficients.

10. The method according to claim 8, offsetting the difference of illumination conditions in the step for outputting an image is realized by detecting a change in the illumination conditions by employing at least one of an average pixel value of a macro block, a motion vector, and an average pixel value of a corresponding region with a designated pixel size in a reference image, and offsetting an amount of the change.

11. The method according to claim 8, offsetting the difference of illumination conditions in the step for outputting an image is realized by modeling the illumination conditions between a current image $I_c$ and a set of pixels $I_R$ of the reference image corresponding to the current image to a simple linear equation that is expressed by $I_R = L_1 \cdot I_c + L_2$ ($L_1$ and $L_2$ are transformation coefficients of illumination conditions).

12. The method according to claim 8, wherein the mosaic images are generated only for an I picture and a P picture, while a B picture in MPEG compression environment is skipped therefrom.

13. The method according to claim 8 further comprises the step of:

inputting a mosaic image MI (I1, . . . Ik−1) provided by a mosaic image memory that stores mosaic images having been generated up to date in a means for offsetting illumination differences.

14. The method according to claim 6, wherein the step for calculating the coefficient further comprises the sub-steps of:

obtaining a transformation coefficient of a previous P picture and a transformation coefficient of a next P picture;

calculating the transformation coefficient by interpolating the transformation coefficient of the previous P picture and the transformation coefficient of the next P picture; and calculating at least one of a warping coefficient and scale coefficient of an I picture and the P picture, based on the calculated coefficients.

15. The method according to claim 14, wherein, in case of the I picture, the frame-to-frame transformation coefficient is calculated by interpolating the transformation coefficient of the P picture prior to the I picture and the transformation coefficient of the P picture after the I picture, and in case of the P picture, the frame-to-frame transformation coefficient is calculated by utilizing an already encoded motion vector.

* * * * *